United States Patent Office 2,993,994
Patented July 25, 1961

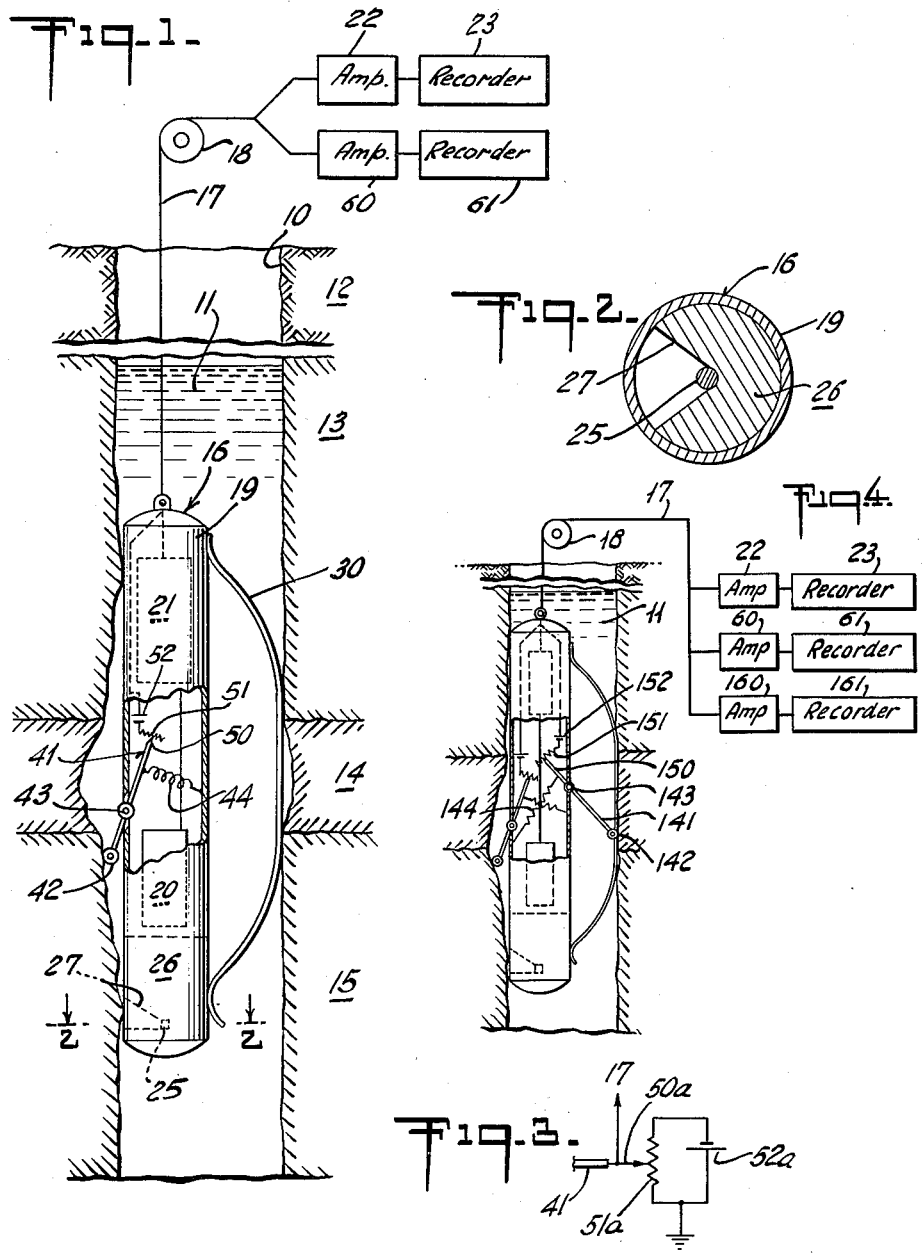

2,993,994
RADIATION WELL LOGGING
Gerhard Herzog, Houston, Tex., assignor to Texaco Inc., a corporation of Delaware
Filed Dec. 6, 1957, Ser. No. 701,141
6 Claims. (Cl. 250—83.3)

The present invention relates generally to the logging of bore holes or wells through the earth by means of radioactivity analysis techniques. More particularly, the invention relates to improvements in radioactivity well logging involving the passage of a source of radiation and a radiation detector through the bore hole in order to provide information as to the nature of the earth formations traversed thereby.

Various kinds of radioactivity well logging are employed in geophysical prospecting. One kind of radioactivity well logging is natural gamma ray logging wherein a radiation detector is passed through the bore hole to measure the natural radiations emitted from the formations. Other forms of radiation well logging include gamma-gamma well logging, neutron-neutron well logging and neutron-gamma well logging. In accordance with three last-mentioned types of log, a source of primary radiation, either neutrons or gamma rays, is passed through the bore hole in order to induce therein secondary radiation, which may comprise neutrons, gamma rays, or both. The secondary radiation is detected and measured as an indication of certain characteristics of the formation.

In the various types of radioactivity well logging, the position of the logging instrument in the bore hole and variations in the size of the bore hole along its length tend to interfere with the logging measurement in an adverse manner. These factors are particularly important in the cases where a source of primary radiation is employed to induce secondary radiations in the formation. The presence of well fluid, ordinarily comprising hydrogenous material in the bore hole, tends to add to the problem, especially where neutrons are involved in the log. Various attempts have been made in the past to overcome these problems. For example, it has been proposed to decentralize the logging instrument by maintaining it against the side of the well bore by the use of resilient means, such as a bow spring, in order to maintain the instrument a fixed distance from the formations being logged and to displace the well fluid between the logging instrument and the formation. Such a technique is shown for example in U.S. Patent No. 2,369,372, Hare, granted February 20, 1945. It has been further proposed in the past to make a caliper measurement of the bore hole size simultaneously with the radioactivity well log in order to provide information as to the size of the bore hole and quantity of well fluid present in the well from place to place in order that this may be taken into account in the interpretation of the radioactivity well log. The aforementioned Hare patent also shows this approach to the problem. U.S. Patent No. 2,761,977, McKay, granted September 4, 1956, also discloses the calipering of a well bore simultaneously with a radioactivity well log.

The aforementioned prior art techniques provide useful information in overcoming the problems associated with variations in bore size and the presence of well fluid on a radioactivity well log. However, the teachings of these patents do not completely overcome these problems. In accordance with these prior art teachings, variations in distance between the logging instrument and the side of the bore hole are minimized and major variations in the size of the bore hole from place to place are taken into account. By pressing the logging instrument against the side of the bore hole during the course of the well log, it is possible to minimize the effect of variations in the size and shape of the bore hole which extend over comparatively long portions of the well bore as compared with the length of the logging instrument since the sensitive volume of the sonde remains a fixed distance from the side of the bore hole. However, it will be seen that variations in the side of the bore hole, even those of comparatively small depth, which are relatively short as compared with the overall length of the instrument, will result in variations in distance between the side of the instrument and the formation since the instrument will tend to ride along the high spots on the side of the formation, even when continuously urged thereagainst by a device such as a bow spring. It will be appreciated that the effect of such minor variations of short length as compared with the length of the logging instrument becomes of significant importance when it is realized that the usual logging instrument is ordinarily many feet in length, usually upwards of 10–20 feet, and that the effective sensitive length of the radiation detector itself is ordinarily much shorter than the total length of the instrument. The sensitive length of the detector is usually of the order of one foot in length and may quite frequently be of the order of 3 or 4 inches in length, especially in the case of a scintillation type detector. Accordingly, it will be appreciated that the aforementioned prior art techniques are deficient in that they do not account for minor variations in distance between the sensitive face of the logging instrument and the side of the bore hole due to variations in mud cake thickness and variations in bore hole diameter due to cracks, wash-outs, or other flaws, which may be of the order of an inch or so to approximately a foot in length along the bore hole and which often is as small as an inch or less in depth. These minor variations are particularly important within the first inch of separation between the logging instrument and the side of the bore hole, especially in the case of a neutron log. Hence, this is an important factor when the logging instrument is resiliently maintained against the side of the bore hole.

Accordingly, it is an object of the present invention to provide improvements in radioactivity logging techniques which overcome difficulties due to the presence of relatively small flaws or openings along the bore hole.

It is a further object of the present invention to provide an improved radioactivity logging instrument including means for correcting variations in a log due to small variations in the contour of a well bore.

It is another object of the present invention to provide improvements in radioactivity well logging for overcoming adverse effects due to variations in distance between the logging instrument and the side of the bore hole.

It is still a further object to accomplish the preceding objects in a manner that does not interfere with the radioactivity log.

Briefly stated, in accordance with the present invention, a vertically elongated radiation logging instrument is passed through a bore hole and while being continuously urged toward one side of the bore hole, primary radiation is emitted from the instrument to bombard the formation and secondary radiation resulting from said primary radiation is detected in a zone whose vertical dimension is a minor fraction of the length of the elongated instrument. Simultaneously, the side of the bore hole opposite the sensitive face of the instrument is probed to measure the distance between the sensitive face of the instrument and the formation in order to detect minor variations in this distance due to such causes as mud cake and flaws along the side of the bore hole opposite the sensitive face of the instrument. A signal proportional to the detected radiation and a signal proportional to the distance between the sensitive face of the instrument and the formation as determined by said probe are recorded in correlation with the depth of the instrument in the bore hole.

A novel radioactivity logging instrument in accordance with the invention comprises an elongated housing for supporting a source of penetrative radiation and a detector of secondary radiation spaced from one another along the longitudinal axis of the instrument. Resilient means are provided for continuously urging the instrument against one side of a bore hole. On the side of the instrument that is urged toward the side of the bore hole, there is provided a caliper probe that is resiliently urged against the formation adjacent the instrument in order to detect and measure slight irregularities in the side of the bore hole.

For additional objects and advantages, and for a better understanding of the invention, attention is now directed to the following description and accompanying drawing. The features of the invention which are believed to be novel are particularly pointed out in the appended claims.

Referring to the drawing:

FIGURE 1 is a vertical-sectional elevation through a bore hole traversing a plurality of earth formations and having suspended therein a radioactivity logging instrument embodying principles of the invention;

FIGURE 2 is a cross-sectional view of a portion of a well logging instrument taken through the line 2—2 of FIGURE 1;

FIGURE 3 is a schematic representation of another version of a portion of the instrument shown in FIGURE 1; and, FIGURE 4 is a vertical sectional elevation illustrating a modified form of radioactivity logging instrument similar to that of FIGURE 1, and which embodies a further aspect of the invention.

Referring now to FIGURE 1, there is shown a bore hole 10 containing the usual hydrogenous bore hole fluid 11 and which traverses a series of earth formations 12, 13, 14, and 15. Within the bore hole 10 there is shown a logging instrument 16 suspended therein as by means of a cable 17, which may also provide means for electrically coupling the instrument 16 to electrical apparatus at the surface of the earth. A measuring device 18 is illustrated diagrammatically in contact with the cable 17 for determining the length of the cable 17 lowered into the bore hole 10 throughout a logging operation as an indication of the position of the instrument 16 in the bore hole 10.

The instrument 16 comprises an elongated housing or capsule 19 formed in accordance with known techniques of stainless steel or the like in order to withstand the conditions of pressure and temperature ordinarily encountered in a bore hole through the surface of the earth. Within the housing 19, there is provided a radiation detector 20 having an effective sensitive length along the longitudinal axis of the instrument 16 that may be of the order of a few inches to approximately one foot, and which represents a minor fraction of the total length of the instrument 16. For example, the detector 20 may be a Geiger-Mueller type detector, such as the multiple cathode plate detector, or it may comprise a highly sensitive scintillation detector having a luminophor suitable for detecting radiation in accordance with the type of log to be made. Also within the housing 19 above the detector 20, there is provided a preamplifier 21 for enhancing the electrical output of the detector 20. The output of the preamplifier 21 is coupled through the cable 17 to an amplifier 22 and then to a recorder 23 for providing a graphic display of the logging signal in correlation with the position of the instrument 16 in the bore hole 10.

Within the housing 19, below the detector 20 and spaced therefrom a predetermined distance, there is provided a suitable radiation source 25, as determined by the type of radioactivity log to be conducted. The source 25 is mounted within an appropriate shielding member 26 having a radiation permeable aperture 27 for directing the radiation outwardly into the formation to be logged. The shielding member 26 is formed of appropriate material in accordance with known principles to prevent radiation(s) emitted by the source from passing directly to the detector 20. For example, the shield 26 may be formed of lead or tungsten to shield against gamma rays. To shield against neutrons, the shield may comprise a moderator together with an appropriate neutron capturing material, such as cadmium or boron. A combination of these or other materials may be employed to shield against neutrons, gamma rays, or a combination thereof in accordance with well-known principles. Advantageously, the aperture 27 in the shield 26 is generally of pie-shaped configuration, as shown in FIGURE 2.

Resilient pressure means, shown in the form of a bow spring 30, are affixed to one side of the instrument 16 for continuously urging the instrument 16 against one side of the bore hole 10. The bow spring 30 is affixed to the instrument 16 in such manner that one or both ends thereof are in slidable engagement with the instrument 16 so that the spring 30 is free to flex along the axis of the instrument 16 in order to permit the instrument 16 to pass through areas of the bore hole 10 of different diameter without binding which might cause the instrument 16 to become wedged therein. By thus maintaining the instrument 16 against one side of the bore hole 10 through the use of the bow spring 30, the sensitive face or side of the instrument, i.e., the side toward which the radiation permeable portion of the shield 26 is directed, is maintained in close proximity to the adjacent earth formations with a minimum of bore hole space, therefore a minimum of bore hole fluid, being interposed between the detector 20 and the formation being logged as well as between the source 25 and the formation being logged.

In order to account for minor variations in the configuration of the bore hole opposite the sensitive side of the instrument 16, there is provided a caliper device for sensing slight variations in the side of the bore hole 10 opposite the instrument 16 in the logging zone. The caliper device comprises a feeler arm 41 including a probe member 42 that is resiliently urged outwardly from the instrument 16 to contact the surface of the bore hole 10 opposite the detector 20. The probe 42 is shown pivotally mounted to the housing 19 about an axis 43. A tension spring 44 is connected between one end of the arm 41 and the housing 19 to maintain the probe 42 against an adjacent formation. The position of the probe 42 is converted into an electric signal which is transmitted to the surface as in the case of the logging information obtained from the detector 20. This may be accomplished by employing the end of the arm 41 remote from the probe 42 to control the position of a wiper contact 50 on an electrical impedance element shown as a variable resistor 51. The resistor 51 is connected in circuit with a battery 52 to provide an electrical signal which varies in accordance with the position of the probe 42. The electrical signal indicative of the position of the probe 42 is transmitted over the cable 17 to the surface. At the surface this signal is applied to an amplifier 60 which, in turn, is to be coupled to a recorder 61 for providing a continuous display indicative of variations in the face of the bore hole 10 opposite the sensitive face of the logging instrument 16 in correlation with the position of the instrument 16 in the bore hole 10.

In accordance with the illustrated embodiment of the invention, the position of the probe 42 is converted to an electric signal by varying the position of the wiper arm 50 of a variable resistor 51 that is connected in series circuit with a source of potential shown as the battery 52. The wiper arm 50 completes the circuit path to the instrument housing 19 which is at ground potential. A ground-return system is employed to transmit the electric signal to the amplifier 60 at the surface. Certain variations may be made in this arrangement without departing from the spirit and scope of the invention. For example, as shown in FIGURE 3, a variable resistor 51a may be connected in parallel circuit with a source of potential 52a in order to give a potential variation proportional to the position of a wiper arm 50a attached to the arm 41 including the probe 42. In this case the wiper arm 50a of the variable resistor 51a is insulated from ground, including the housing 19, and the potential sensed by the wiper arm 50a is transmitted to the surface equipment over the cable 17. As in the case of FIGURE 1, a ground-return system is shown.

Among the advantages of the present invention is the fact that the measurement of minor variations in the side of the well bore opposite the sensitive face of the detecting instrument is made in a manner that is unaffected by variations in any characteristic of the well fluid. In fact, these measurements in accordance with the present invention are completely independent of well fluid and thus can be made in a well bore regardless of whether fluid is present or not and may be made in either a liquid or gaseous fluid medium.

In the case of a neutron-type log, either neutron-neutron or neutron-gamma ray, it is contemplated that an additional caliper log may advantageously be conducted on the back side of the logging instrument, i.e., the side remote from the sensitive face of the logging instrument, concurrently with the determination of minor variations in the configuration of the formation adjacent to the sensitive face of the detector. The additional caliper log is employed to determine variations in the overall size of the bore hole, as opposed to the specific information as to minor variations obtained in accordance with the features of the invention as set forth above.

The additional or overall caliper log may be carried out through the instrumentality of an additional probe member for sensing major variations in the size of the bore hole and may comprise apparatus such as that illustrated in FIGURE 4.

Referring particularly to FIGURE 4, there is shown an apparatus similar to that of FIGURE 1 wherein an additional caliper device comprises a feeler arm 141 including a probe member 142 that is resiliently urged outwardly from the instrument 16 to contact the inner side of the bow spring 30 which, in turn, rides against the side of the bore hole. The feeler arm 141 is shown pivotally mounted to the housing 19 about an axis 143. A tension spring 144 is connected between one end of the arm 141 and the housing 19 to maintain the probe 142 resiliently urged against the inner side of the bow spring 30. The position of the probe 142 is converted into an electrical signal which is transmitted to the surface along with the other signal information. This may be accomplished by employing the end of the arm 141 remote from the probe 142 to control the position of a wiper contact 150 on an electrical impedance element shown as a variable resistor 151. The resistor 151 is connected in circuit with a battery 152 to provide an electrical signal which varies in accordance with the position of the probe 142. The electrical signal indicative of the position of the probe 142 is transmitted over the cable 17 to the surface of the earth. At the surface this signal is applied to an amplifier 160 which, in turn, is coupled to a recorder 161 for providing a continuous display indicative of major variations in the size of the bore hole.

It is to be understood that the position of the probe 142 may be converted to an electric signal in accordance with other circuit arrangements, as for example that shown in FIGURE 3.

Obviously, many modifications and variations of the invention, as hereinbefore set forth, may be made without departing from the spirit and scope thereof, and therefore only such limitations should be imposed as are indicated in the appended claims.

I claim:

1. A radioactivity logging instrument suitable for determining the nature of earth formations traversed by a bore hole comprising an elongated housing having mounted thereto a source of penetrative radiation and a detector of secondary radiation spaced from one another along the longitudinal axis of the instrument, resilient decentralizing means for continually urging an elongated side of the instrument against one side of the bore hole, means for detecting and measuring minor variations in the side of the bore hole against which the sensitive side of the instrument is urged comprising a mechanical caliper probe attached to said instrument and extending outwardly from the side of said instrument remote from the decentralizing means, said caliper probe including means for resiliently urging it against a formation adjacent the instrument, and means for producing an electric signal proportional to the position of said probe.

2. A radioactivity logging instrument suitable for determining the nature of earth formations traversed by a bore hole comprising an elongated housing having mounted thereto a source of penetrative radiation and a detector of secondary radiation spaced from one another along the longitudinal axis of the instrument, the effective sensitive length of said detector being a minor fraction of the total length of said instrument along its major axis, resilient decentralizing means for continually urging an elongated side of the instrument against one side of the bore hole, means for detecting and measuring minor variations in the side of the bore hole against which the sensitive side of the instrument is urged comprising a mechanical caliper probe attached to said instrument and extending outwardly from the side of said instrument remote from the decentralizing means, said caliper probe including means for resiliently urging it against a formation adjacent the instrument, and means for producing an electric signal proportional to the position of said probe.

3. Radioactivity logging apparatus suitable for determining the nature of earth formations traversed by a bore hole comprising an elongated instrument including a source of penetrative radiation and a detector of secondary radiation spaced from one another along the longitudinal axis of the instrument, resilient decentralizing means for continuously urging an elongated sensitive side of the instrument against one side of the bore hole, means for detecting and measuring minor variations in the side of the bore hole against which said sensitive side of the instrument is urged comprising a mechanical probe attached to said instrument and extending outwardly from the side of said instrument remote from the decentralizing means, said probe including means for resiliently urging it against a formation adjacent to the instrument, means for calipering the size of the bore hole for detecting and measuring major variations in the bore hole throughout the log, and signal indicating means for providing display information indicative of a function of the detected radiation, the extent of minor variations in the side of the bore hole as determined by said probe, and the size of the bore hole as determined by said caliper means.

4. Apparatus in accordance with claim 3 wherein the effective sensitive length of said detector is a minor fraction of the total length of said instrument along its major axis.

5. Apparatus in accordance with claim 1 wherein said source is a gamma ray source.

6. Apparatus in accordance with claim 1 wherein said source is a neutron source.

References Cited in the file of this patent

UNITED STATES PATENTS 2,369,672    Hare _____ Feb. 20, 1945

(Other references on following page)

UNITED STATES PATENTS

| | | | |
|---|---|---|---|
| 2,532,536 | Boucher | Dec. 5, | 1950 |
| 2,648,778 | Silverman | Aug. 11, | 1953 |
| 2,725,486 | Walstrom | Nov. 29, | 1955 |
| 2,736,967 | Doll | Mar. 6, | 1956 |
| 2,761,977 | McKay | Sept. 4, | 1956 |
| 2,769,918 | Tittle | Nov. 6, | 1956 |
| 2,778,950 | Frey et al. | Jan. 22, | 1957 |
| 2,785,315 | Goodman | Mar. 12, | 1957 |
| 2,864,173 | Castel | Dec. 16, | 1958 |